(12) United States Patent
Noe

(10) Patent No.: US 12,604,889 B2
(45) Date of Patent: Apr. 21, 2026

(54) SPINNING WING DECOY TECHNOLOGY

(71) Applicant: Expedite International, inc., Baldwin, WI (US)

(72) Inventor: Tim Noe, Hudson, WI (US)

(73) Assignee: Expedite International, Inc., Baldwin, WI (US)

( * ) Notice: Subject to any disclaimer, the term of this patent is extended or adjusted under 35 U.S.C. 154(b) by 119 days.

(21) Appl. No.: 18/430,526

(22) Filed: Feb. 1, 2024

(65) Prior Publication Data

US 2025/0000081 A1 Jan. 2, 2025

Related U.S. Application Data

(63) Continuation-in-part of application No. 17/447,862, filed on Sep. 16, 2021, now Pat. No. 12,302,891.

(60) Provisional application No. 63/079,192, filed on Sep. 16, 2020.

(51) Int. Cl.
A01M 31/06 (2006.01)

(52) U.S. Cl.
CPC .................................... A01M 31/06 (2013.01)

(58) Field of Classification Search
CPC ...................................................... A01M 31/06
USPC ........................................................... 43/3, 2
See application file for complete search history.

(56) References Cited

U.S. PATENT DOCUMENTS

| | | | | | |
|---|---|---|---|---|---|
| 2,229,175 A | * | 1/1941 | Johnson | ................. | A63H 23/10 |
| | | | | | 43/3 |
| 5,884,427 A | * | 3/1999 | Lenz | ...................... | A01M 31/06 |
| | | | | | 43/2 |
| 5,930,936 A | * | 8/1999 | Parr | ....................... | A01M 31/06 |
| | | | | | 43/3 |
| 6,092,323 A | * | 7/2000 | McBride | ............... | A01M 31/06 |
| | | | | | 43/3 |
| 6,170,188 B1 | * | 1/2001 | Mathews | .............. | A01M 31/06 |
| | | | | | 43/3 |
| 6,212,816 B1 | * | 4/2001 | Babbitt | ................. | A01M 31/06 |
| | | | | | 43/3 |
| 6,339,894 B1 | * | 1/2002 | Solomon | ............... | A01M 31/06 |
| | | | | | 43/3 |
| 6,493,980 B1 | * | 12/2002 | Richardson | ........... | A01M 31/06 |
| | | | | | 43/3 |
| 6,508,028 B1 | * | 1/2003 | Crowe | .................. | A01M 31/06 |
| | | | | | 43/3 |
| 6,675,522 B2 | * | 1/2004 | Mathews | .............. | A01M 31/06 |
| | | | | | 43/3 |

(Continued)

FOREIGN PATENT DOCUMENTS

| | | | | | |
|---|---|---|---|---|---|
| CN | 214677351 U | * | 11/2021 | | |
| CN | 217284591 U | * | 8/2022 | | |
| EP | 1179296 A2 | * | 2/2002 | ............ | A01M 29/06 |

*Primary Examiner* — Darren W Ark

(74) *Attorney, Agent, or Firm* — GRUMBLES LAW PLLC; Bryan Kravis

(57) ABSTRACT

A system, apparatus and method for controlling the stoppage of a spinning wing of a migratory bird decoy. When power is turned off by a remote controller a motor shaft needs to stop spinning so that the dark side of a wing stops facing upward. At least one magnet is attached to the motor shaft and a ferromagnetic magnet target is disposed off of the motor shaft, which causes the motor shaft/wing to be oriented in the correct position with the Dark Side (Feather) Up when power is terminated to the spinning wings.

11 Claims, 8 Drawing Sheets

(56) References Cited

U.S. PATENT DOCUMENTS

| | | | |
|---|---|---|---|
| 7,671,749 B2* | 3/2010 | Alvarado | A01M 29/06 |
| | | | 340/573.2 |
| 7,814,857 B2* | 10/2010 | Hally | A01M 29/16 |
| | | | 116/22 A |
| 7,884,730 B2* | 2/2011 | Alvarado | A01M 29/06 |
| | | | 340/573.2 |
| 8,188,691 B1* | 5/2012 | Twohig | A01M 31/06 |
| | | | 43/2 |
| 9,538,744 B1* | 1/2017 | Campbell | F16H 21/44 |
| 10,638,747 B2* | 5/2020 | Noe | G06F 13/385 |
| 11,246,307 B2* | 2/2022 | Noe | A01M 31/06 |
| 11,344,024 B2* | 5/2022 | Zink | A01M 31/06 |
| 12,239,122 B2* | 3/2025 | Denmon | A01M 31/06 |
| 12,302,891 B1* | 5/2025 | Noe | A01M 31/06 |
| 2002/0069572 A1* | 6/2002 | Price, Sr. | A01M 31/06 |
| | | | 43/3 |
| 2003/0110676 A1* | 6/2003 | Mathews | A01M 31/06 |
| | | | 43/3 |
| 2005/0144828 A1* | 7/2005 | Lewis | A01M 31/06 |
| | | | 43/3 |
| 2009/0188148 A1* | 7/2009 | Orris | A01M 31/06 |
| | | | 43/2 |
| 2011/0023349 A1* | 2/2011 | Hughes | A01M 31/06 |
| | | | 43/2 |
| 2014/0033596 A1* | 2/2014 | Schukow | A01M 29/06 |
| | | | 43/2 |
| 2016/0309704 A1* | 10/2016 | Young | A01M 31/06 |
| 2017/0042138 A1* | 2/2017 | Oshgan | A01M 31/06 |
| 2019/0000069 A1* | 1/2019 | Zink | A01M 31/06 |
| 2020/0008418 A1* | 1/2020 | Peoples | A01M 31/06 |
| 2020/0077640 A1* | 3/2020 | Jarboe | A01M 31/06 |
| 2025/0000081 A1* | 1/2025 | Noe | A01M 31/06 |

* cited by examiner

SPINNING WING DECOY TECHNOLOGY

NOTICE OF COPYRIGHTS AND TRADE DRESS 37 C.F.R. § 1.71(e) AUTHORIZATION

A portion of the disclosure of this patent document may contain material which is subject to copyright protection, or which has become trade dress. The copyright and trade dress owner has no objection to the facsimile reproduction by anyone of the patent document or the patent disclosure, as it appears in the US Patent and Trademark Office patent file or records, but otherwise reserves all copyright and trade dress rights whatsoever.

CROSS-REFERENCE TO RELATED APPLICATIONS, IF ANY

This application is a Continuation In Part (CIP) of U.S. patent application Ser. No. 17/447,862, filed Sep. 16, 2021, status Pending, which claims the benefit under 35 U.S.C. § 119(e) of co-pending U.S. Provisional Patent Application Ser. No. 63/079,192, filed Sep. 16, 2020, which is hereby incorporated by reference.

If an Application Data Sheet(s) (ADS) has been filed in this application, it is incorporated by reference herein. Any applications claimed in an ADS for priority under 35 USC 119, 120, 121 or 365, and any and all parent, grandparent, great-grandparent, etc. applications of such applications, are also incorporated by reference, including any priority claims made in those applications and any material incorporated by reference, to the extent such subject matter is not inconsistent herewith.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to hunting decoy systems, apparatus and methods. Particularly, the invention relates to a spinning wing migratory bird (waterfowl, ducks, geese, doves, and the like) decoy. Most particularly, the invention relates to a system, apparatus, and method for controlling the stoppage of spinning wings on a decoy to maximize the attraction of migratory birds to the decoy.

2. Background Information

Decoys have been used for many years to imitate an animal, such as a bird, for the purpose of attracting other birds to a particular location for hunting or other purposes. Modern migratory bird and waterfowl decoys come in many types, including floating, ground placed, and stake or base mounted. Decoy bodies may have fixed wings or movable wings. Movable wings may be spinning, flapping, or the like. And movable wings may be actuated by motor power, by wind, or by other forces. Many waterfowl decoys are constructed of inexpensive plastic materials.

The present invention provides an improved spinning wing migratory bird decoy and a wing control system. When the wings rotate on a spinning migratory bird wing decoy (also known as "spinners"), a visible "flash" is given off because one side of the wing is dark (feather print) and one side of the wing is light, preferably white. Commonly, hunters use a remote control to turn off the spinners because geese and sometimes ducks will not land when the wings are spinning. A major problem that occurs is that sometimes the white side of the wing stops facing up. The white side facing up doesn't look natural, and this tends to scare birds away. Where the wing stops in the prior art is completely random.

Attempts have been made to try to add a weight to one side of the wings to stop them in a certain way, but they have failed. Weighting creates significant vibration, wobble, and noise. Further, weighting ruins the bearings of the motor quickly. Insofar as is known, no one has come up with a way to control how the wing stops on a spinner.

Applicant has also developed a decoy, system, and method for controlling the stoppage of a spinning wing via its motor. When power is turned off by a remote controller, a photo eye sensor system identifies when a motor shaft needs to stop spinning so that the dark side of a wing stops facing upward. When the motor shaft is in a correct location, a wing shaft control cylinder is engaged, which locks the motor shaft/wing in the correct position with the dark side (Feather) Up. When engaged, a pin from the cylinder goes into a motor gear housing, which stops and holds the wing shaft, and therefore the wing, in the correct position.

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides a wing control system, apparatus, and method in or for a spinning wing migratory bird decoy apparatus, method, method of manufacture, and method of use which are practical, reliable, accurate and efficient, and which are believed to fulfill a need and to constitute an improvement over the background technology.

In one aspect, the invention provides a spinning wing bird decoy comprising:

a decoy body, the decoy body being arranged in a predetermined orientation to simulate a bird, the decoy body having a top, a bottom, a first side, and an opposing second side;

a pair of decoy wings, one decoy wing extending from each side of the decoy body, each decoy wing having a first face having a first pattern and an opposing second face having a second pattern which is different from the first pattern, each decoy wing being rotatable with respect the decoy body whereby movement between first and second patterns simulates wing movement of a bird;

a drive assembly disposed inside the decoy body, the drive assembly having first and second rotatable drive shafts, the first drive shaft being connectible to the first wing and the second drive shaft being connectible to the second wing, whereby powering the drive assembly rotates the decoy wings; and a wing stopping assembly for stopping the decoy wings in a predetermined position wherein the first face is disposed upwardly aligned with the top of the decoy body, the wing stopping assembly including at least one magnet coupled to at least one drive shaft of the drive assembly and at least one magnet target to which the magnet is attracted to by magnetic force coupled to the drive assembly.

In another aspect, the invention provides a powered, spinning wing, waterfowl or migratory bird decoy, comprising:

a. a decoy body, the decoy body being arranged in a predetermined orientation to simulate a bird, the decoy body having a top, a bottom, a first side, and an opposing second side, and an inner cavity;

b. a pair of decoy wings, one decoy wing extending from each side of the decoy body, each decoy wing comprising:

i. a flat panel with a proximal end, ii. a connector coupled to the proximal end, and iii. wherein the flat panels have a first face having a relatively dark first pattern and an opposing second face having a second pattern which is substantially lighter than the first pattern, each decoy wing being rotatable with respect the decoy body whereby movement between dark first and light second patterns simulates wing movement of a bird;

c. a drive assembly disposed inside the decoy body, the drive assembly having:

i. a housing, ii. a direct drive DC motor disposed in the housing, and iii. first and second rotatable drive shafts driven by the motor, the first drive shaft being connectible to the first wing and the second drive shaft being connectible to the second wing, whereby powering the motor rotates the decoy wings; and d. a wing stopping assembly for stopping the decoy wings in a predetermined position wherein the first face is disposed upwardly aligned with the top of the decoy body, the wing stopping assembly including at least one magnet coupled to at least one drive shaft of the drive assembly and at least one magnet target to which the magnet is attracted to by magnetic force coupled to the drive assembly.

The aspects, features, advantages, benefits and objects of the invention will become clear to those skilled in the art by reference to the following description, claims and drawings.

DETAILED DESCRIPTION

Figure 1:
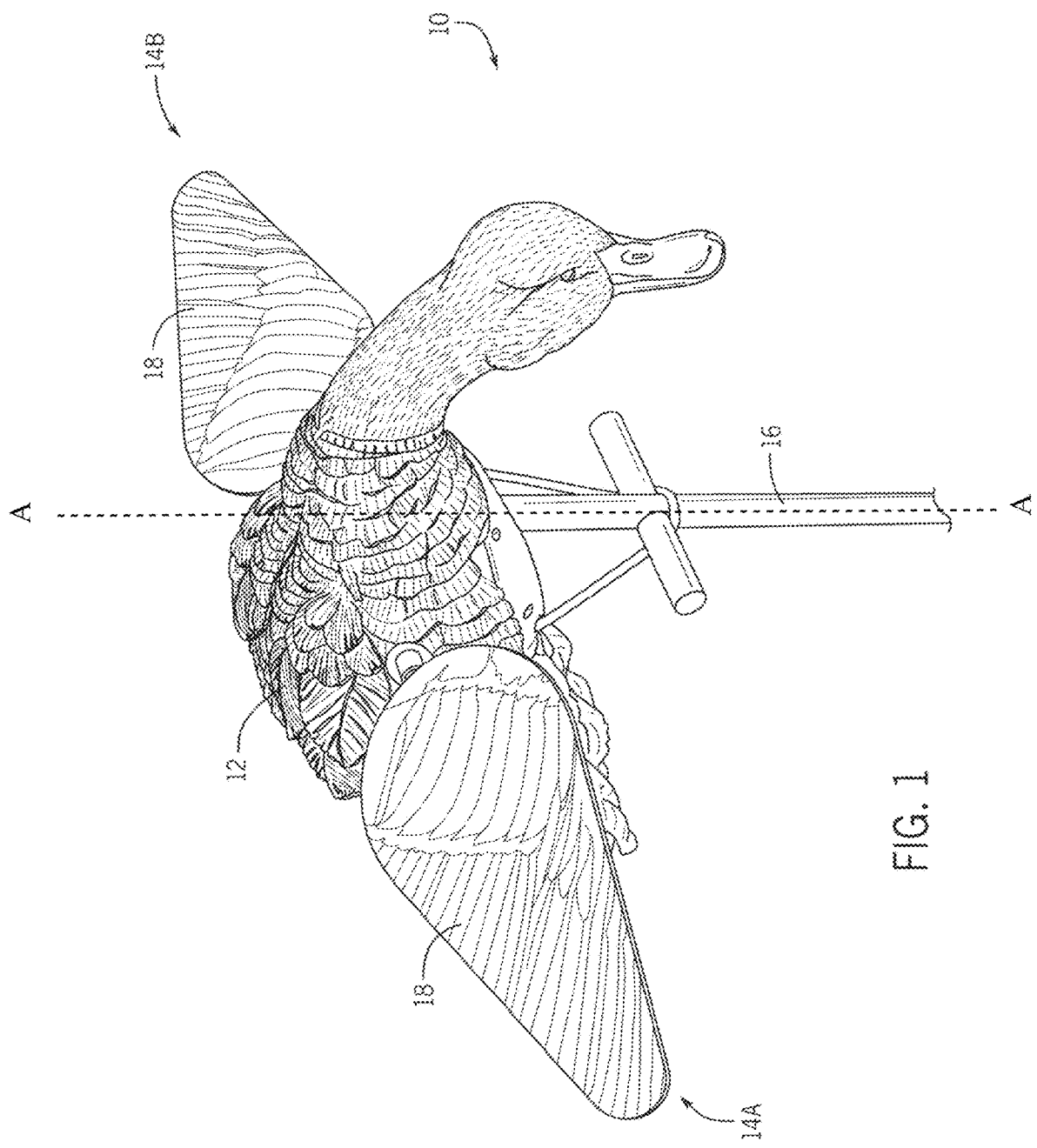
FIG. 1 is perspective (or isometric) view, from the top front, of a spinning wing migratory bird decoy, and showing one side of the wings with a dark surface look or color, typically including a feather pattern that mimics the top or outer side of waterfowl or other migratory bird wings.

The description that follows describes, illustrates and exemplifies one or more embodiments of a spinning wing decoy with correct, Feather Up positioning. This description is not provided to limit the disclosure to the embodiments described herein, but rather to explain and teach various principles to enable one of ordinary skill in the art to understand these principles and, with that understanding, be able to apply them to practice not only the embodiments described herein, but also other embodiments that may come to mind in accordance with these principles. The scope of the instant disclosure is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers in cases where such labeling facilitates a more clear description. Additionally, the drawings set forth herein are not necessarily drawn to scale, and in some instances proportions may have been exaggerated to more clearly depict certain features.

Figure 2:
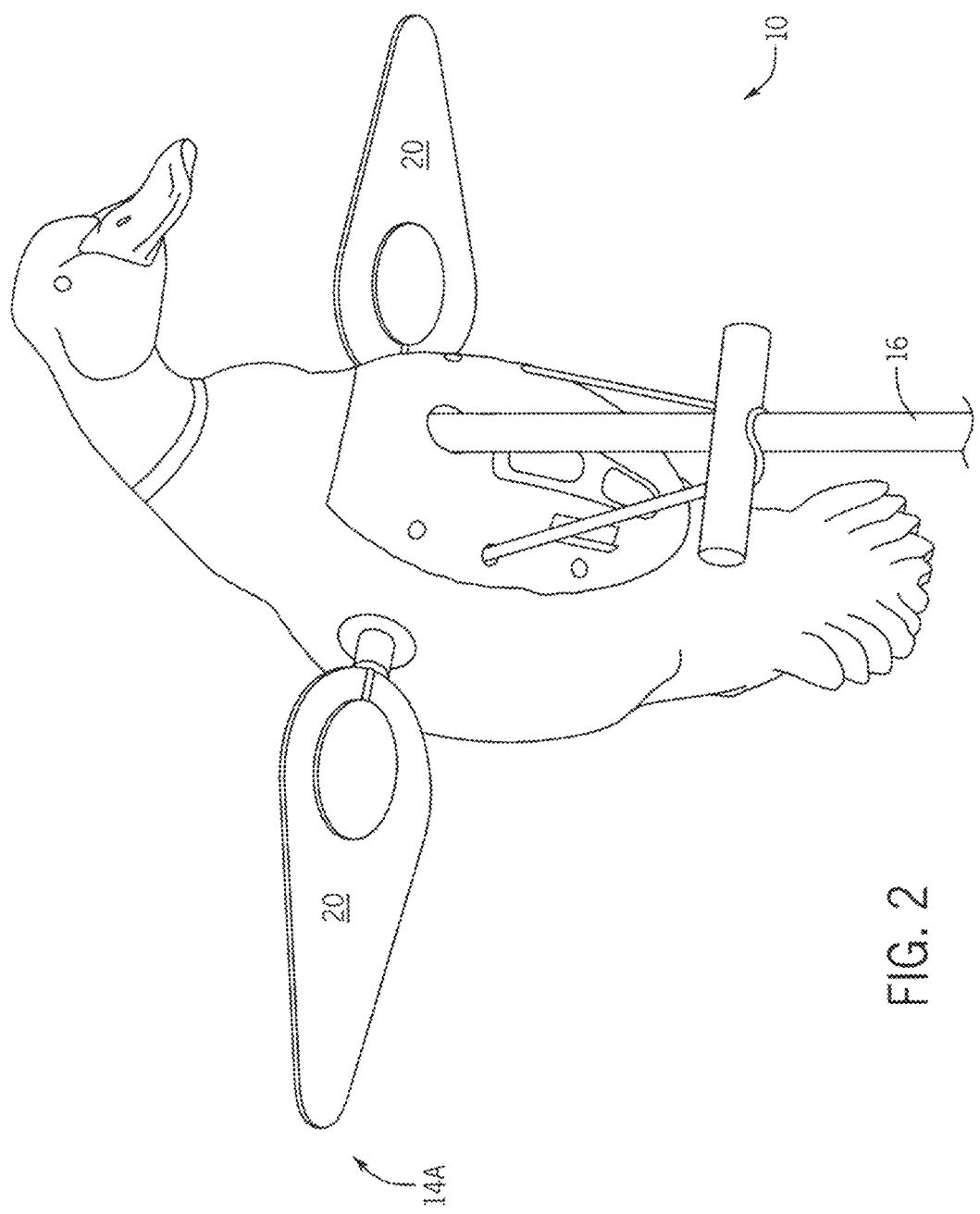
FIG. 2 is a perspective view, from the bottom front, of the decoy and showing the opposite side of the wings with a light look or color, typically white and devoid of a feather pattern.
Figure 3:
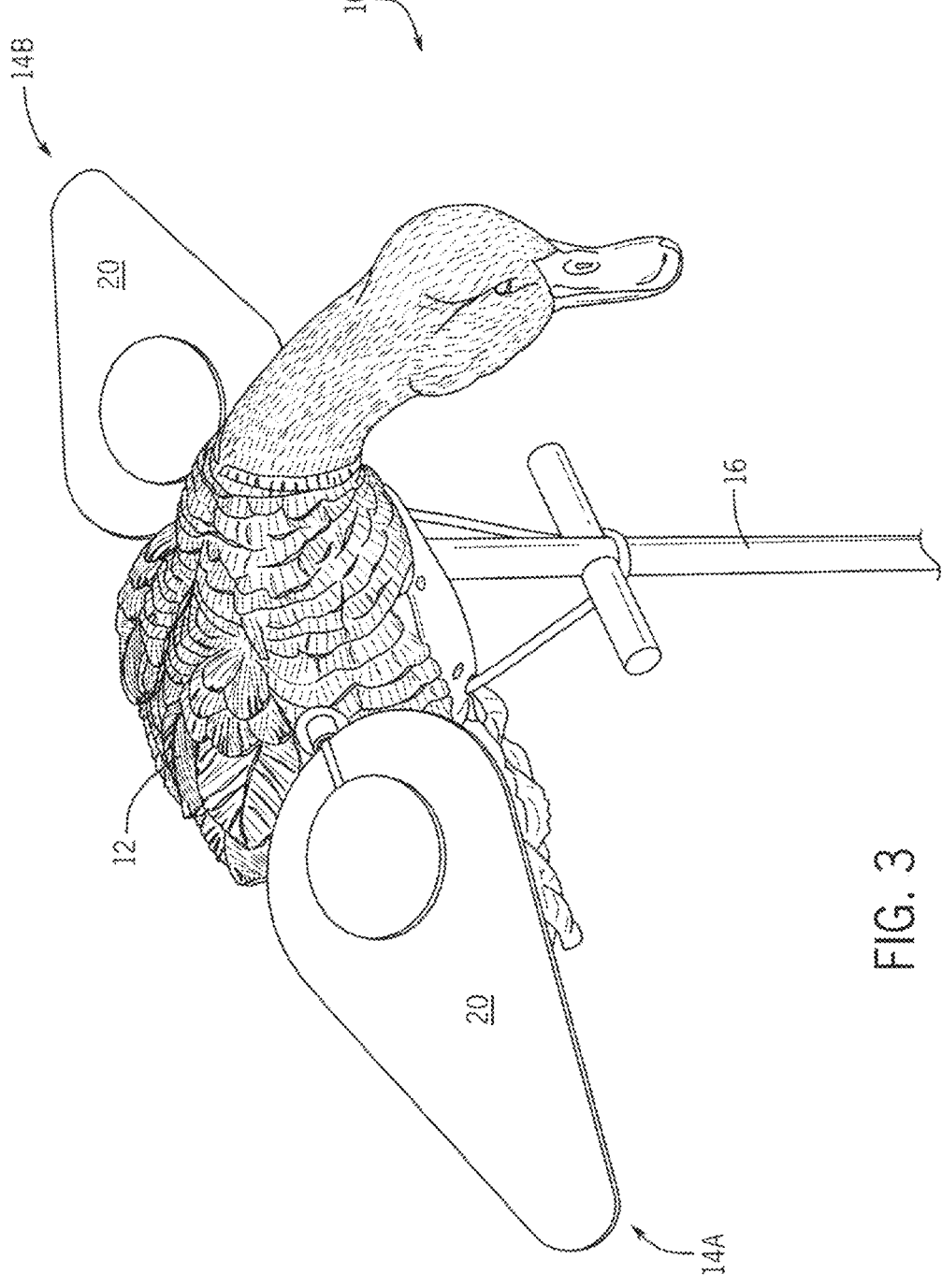
FIG. 3 is a substantially identical view of the decoy as in FIG. 1, wherein the wings are rotated so that the light side of the wings are oriented upwardly.
Figure 5:
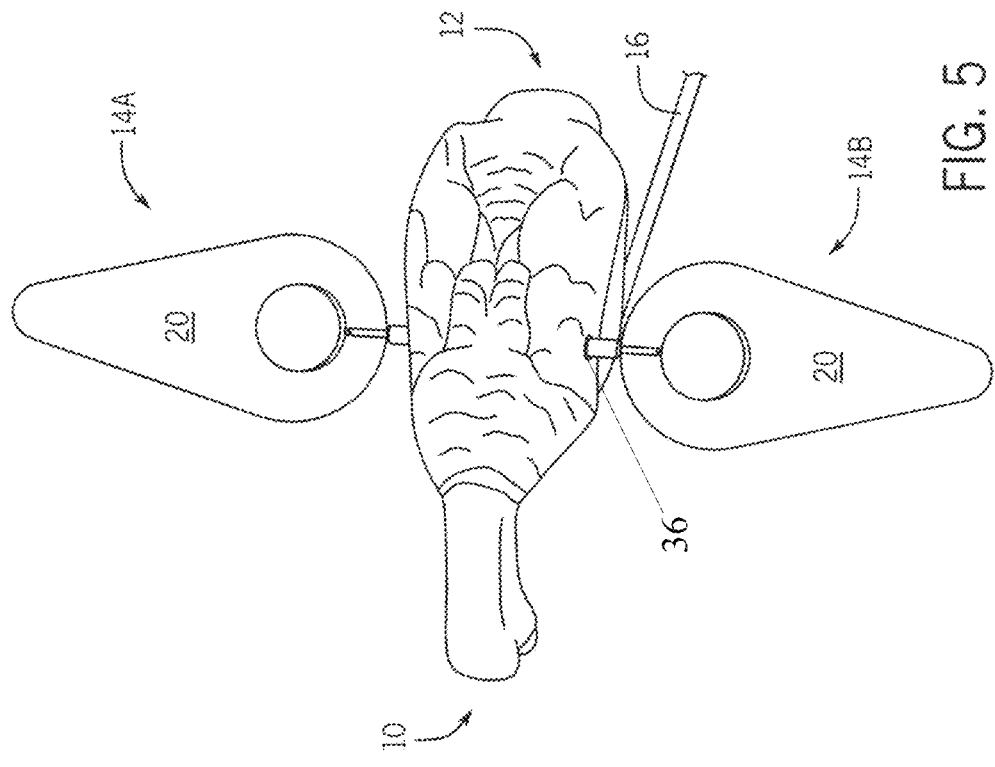
FIG. 5 is a top view of the decoy wherein the wings are stopped with the light, featherless side of the wings oriented upwardly.

Referring initially to FIGS. 1 to 3, the present invention provides an improved spinning wing migratory bird decoy 10 and a wing control system thereof. When the wings 14 rotate on a spinning migratory bird wing decoy (also known as "spinners"), a visible "flash" is given off because one side 18 of the wing is dark (for example a feather print) (See also FIGS. 4 and 6) and one side 20 of the wings 14 is light, preferably white (See also FIGS. 5 and 7). The flash results from the contrast of colors or tones, between dark and light surfaces. Commonly, hunters use a remote control (not shown) to turn off the spinners because geese and sometimes ducks will not land when the wings are spinning. A major problem that occurs is that sometimes the white side 20 of the wing stops facing upward, as shown in FIGS. 3 and 5. The white side 20 facing up doesn't look natural, and this tends to scare birds away. Where the wings stop in the prior art is completely random.

The wing stopping system and method, and the motor module of the present invention may optimally be implemented in a spinning wing migratory bird decoy such as shown and described in U.S. Pat. No. 10,638,747 and/or the LUCKY HD or Hdi Decoys manufactured and sold by Applicants' assignee, Lucky Duck Decoys of Baldwin, Wisconsin USA, all of which are hereby incorporated by reference herein.

FIG. 1 is a perspective view, from the top front, of an embodiment of a spinning wing migratory bird decoy 10.

The decoy 10 has a body 12 from which wings 14 A and B extend. The wings 14 are coupled to the body 12 preferably by connectors 22. In one embodiment, the decoy 10 is mountable on a stand 16. However, the decoy 10 may be a floating style decoy or otherwise placed directly on a surface. One side 18 of the wings 14 have a dark surface look or color, typically including a feather pattern that mimics the top or outer side of waterfowl or other migratory bird wings. The opposite side 20 of the wings 14 have a light look or color, typically white and devoid of a feather pattern. The difference in look mimics a live bird.

Figure 4:
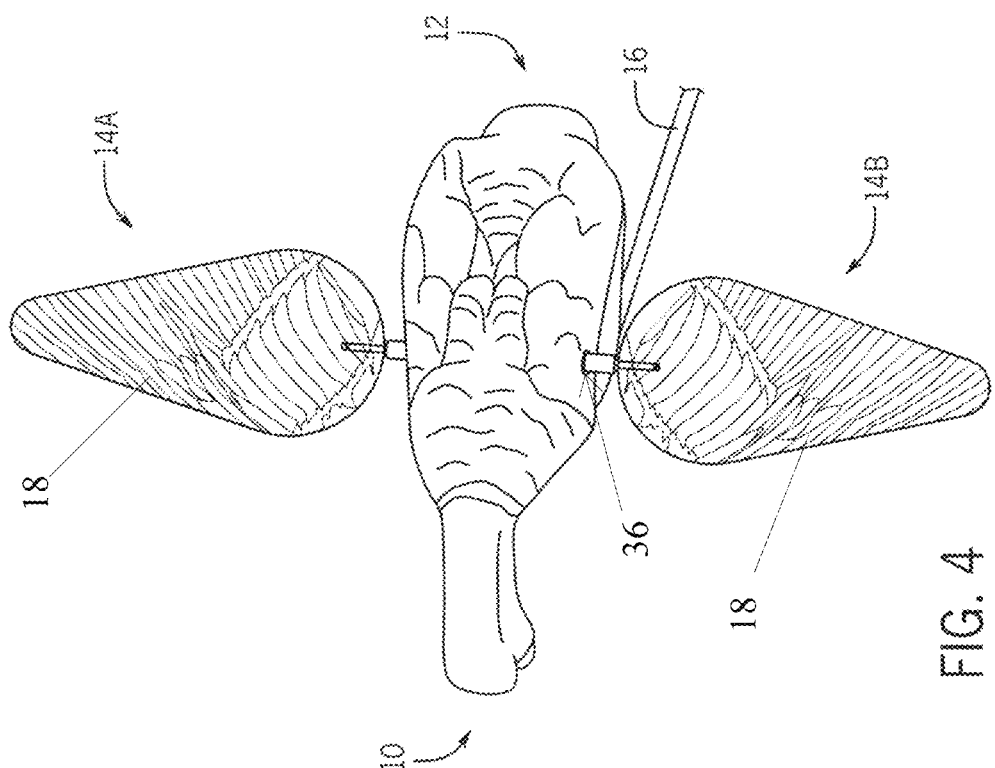
FIG. 4 is a top view of the decoy wherein the wings are stopped with the dark, feather side of the wings oriented upwardly.

FIG. 1 is a perspective view, from the top front, of a spinning wing migratory bird decoy 10 with a body 12 and a pair of wings 14A and 14B extending laterally from the body 12. The decoy 10 is mounted on a stand 16, but it may be positioned otherwise. The wings 14 have a generally flat panel structure with one side 18 having a dark surface look or color, typically including a feather pattern that mimics the top or outer side of waterfowl or other migratory bird wings. FIG. 2 is a perspective view, from the bottom front, of the decoy and showing the opposite side 20 of the wings 14 with a light look or color, typically white and devoid of a feather pattern. When the wings 14 are powered and spin, the alternation between dark 18 and light 20 sides creates a flickering or flashing image that is attractive to other birds because it simulates a bird flapping its wings, and particularly when viewed from above, a bird in the process of landing on water. FIG. 3 is a substantially identical view of the decoy 10 as in FIG. 1, wherein the wings 14 are rotated so that the light side 20 of the wings 14 are oriented upwardly. FIG. 4 is a top view of the decoy 10 wherein the wings 14 are stopped with the dark, feather side 18 of the wings 14 oriented upwardly. FIG. 5 is a top view of the decoy 10 wherein the wings 14 are stopped with the light, featherless side 20 of the wings oriented upwardly. FIGS. 1 and 4 show the desirable position to attract waterfowl, and FIGS. 3 and 5 show the position that is not desirable.

Figure 6:
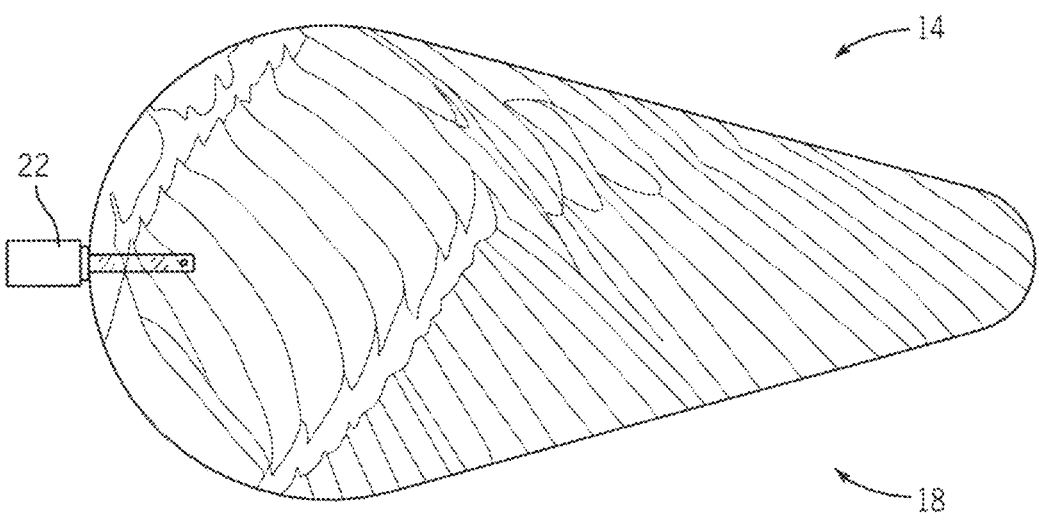
FIG. 6 is a detailed top view of the dark, feather side of a wing.
Figure 7:
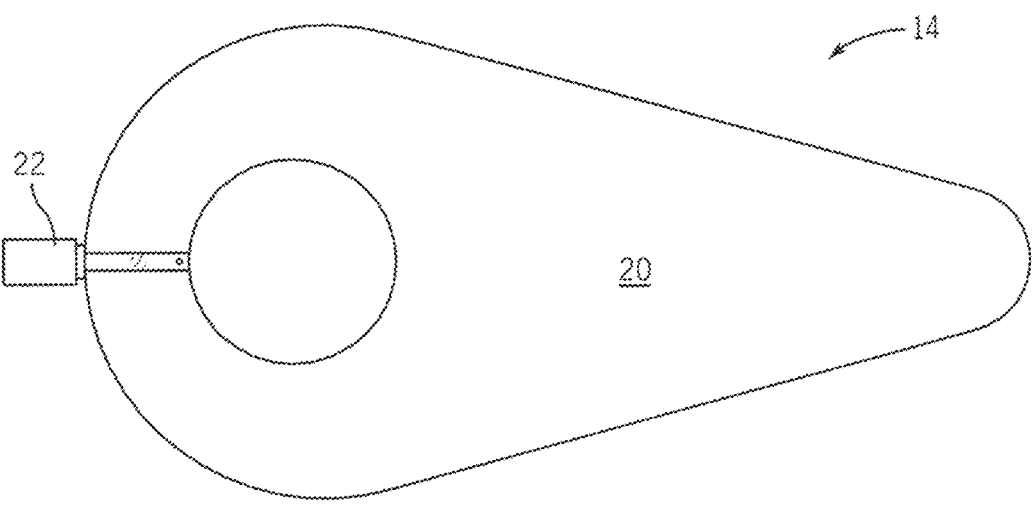
FIG. 7 is a detailed top view of the light, featherless side of the wing.
Figures 8, 9:
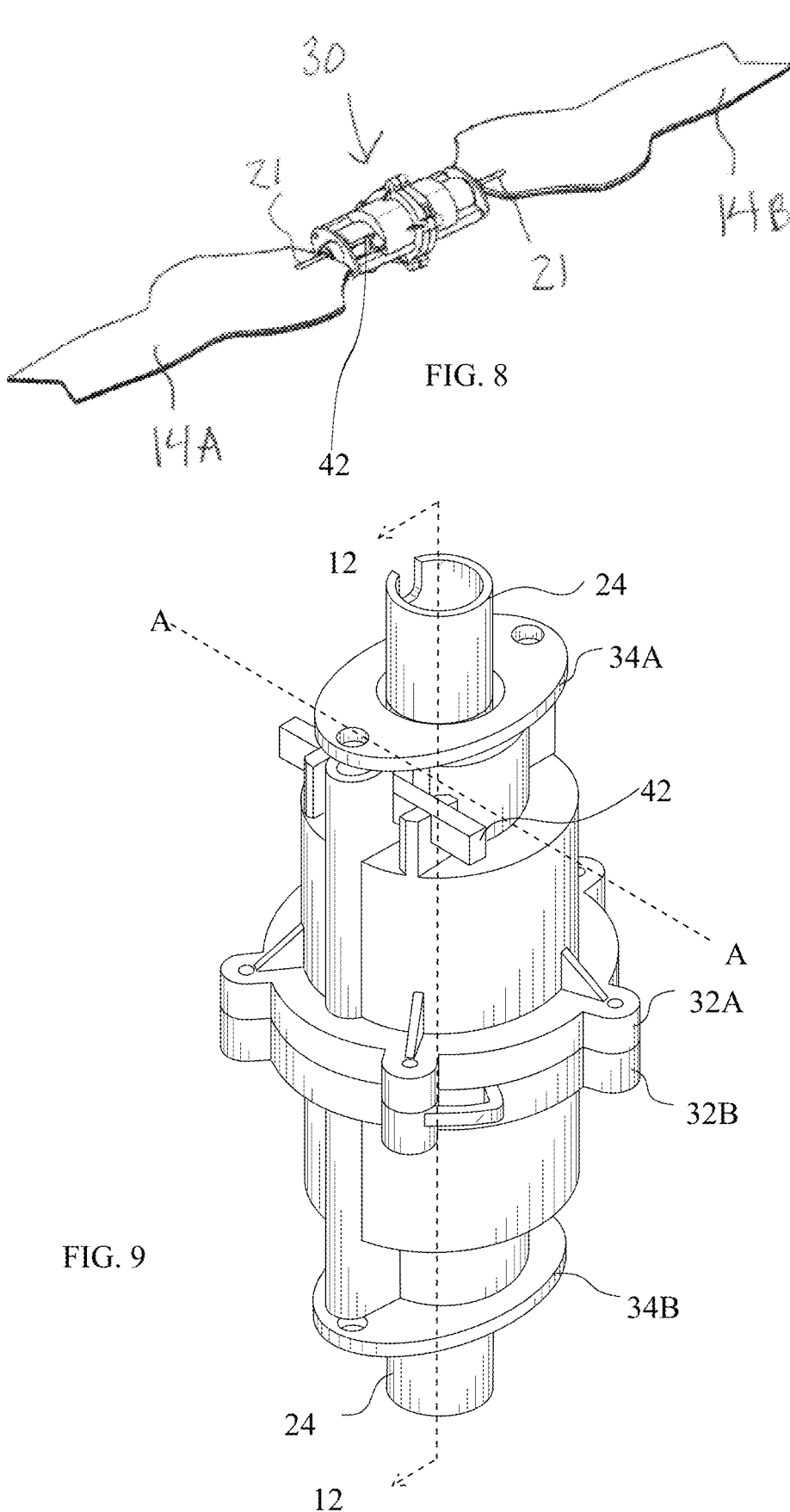
FIG. 8 shows an embodiment of a motor assembly of the invention removed from but oriented with the decoy body.
FIG. 9 is a perspective view of the motor assembly.
Figure 10:
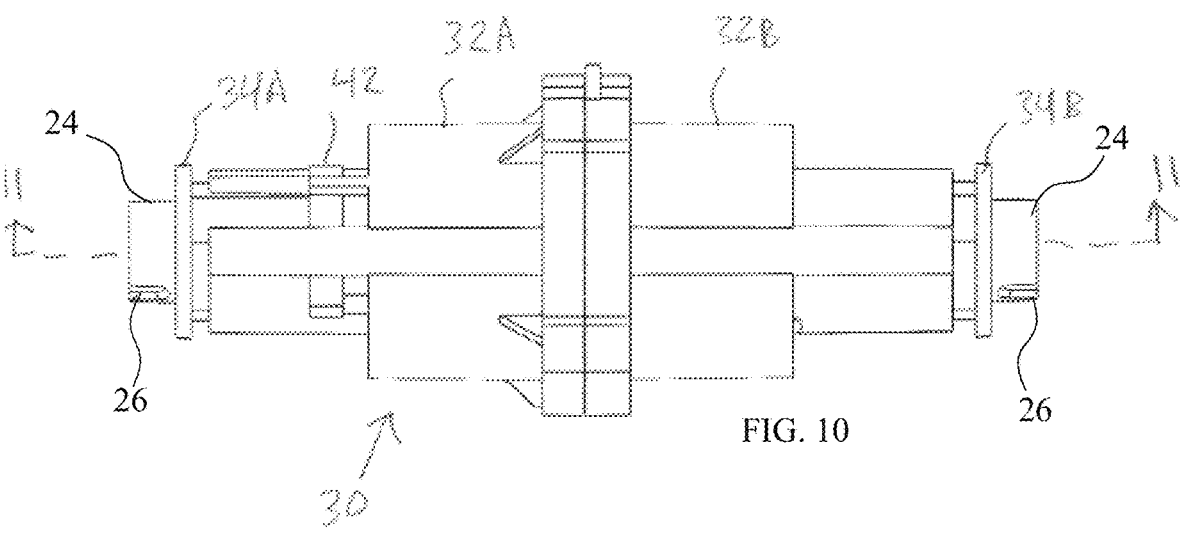
FIG. 10 is an elevation view of the motor assembly.
Figure 11:
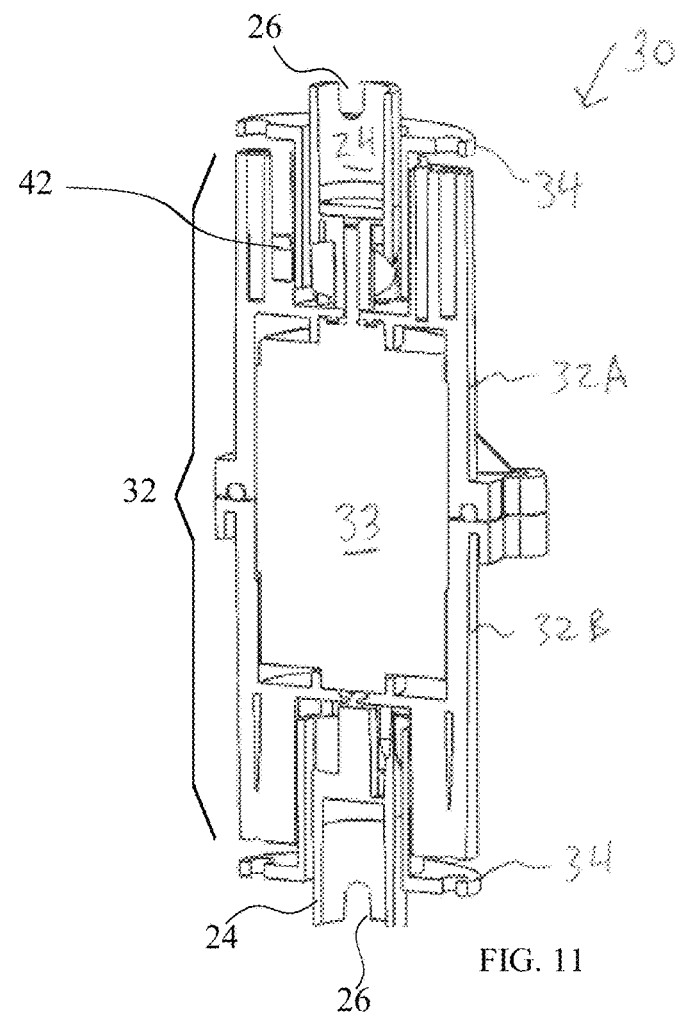
FIG. 11 is a longitudinal cross-sectional view of the motor assembly.
Figure 12:
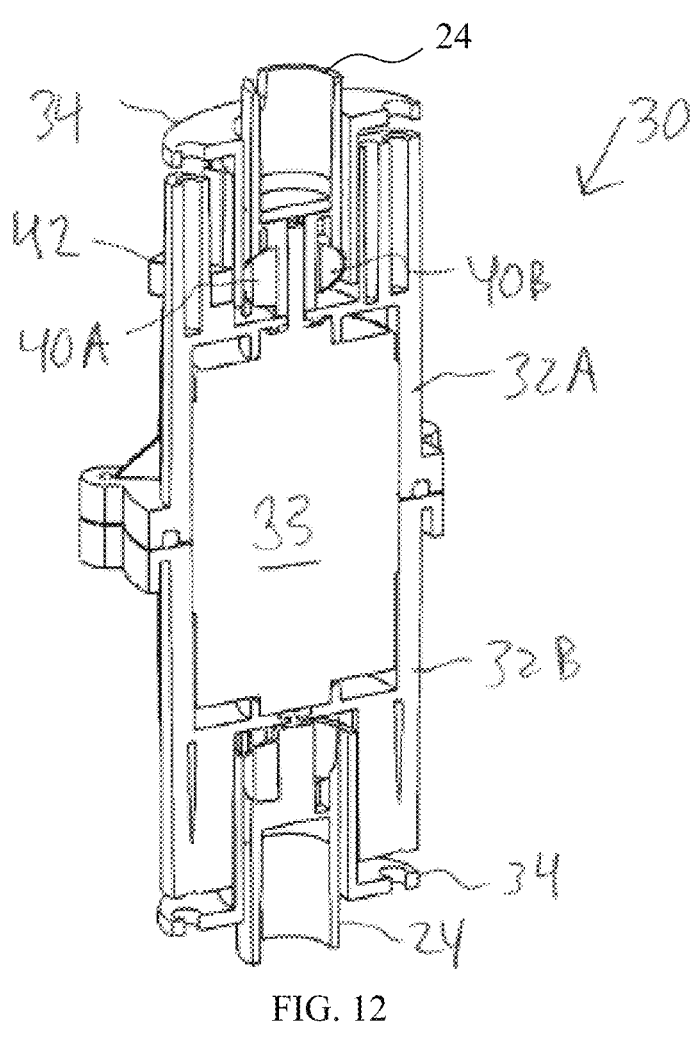
FIG. 12 is a longitudinal cross-sectional view of the motor assembly taken 90 degrees relative to FIG. 11.
Figure 13:
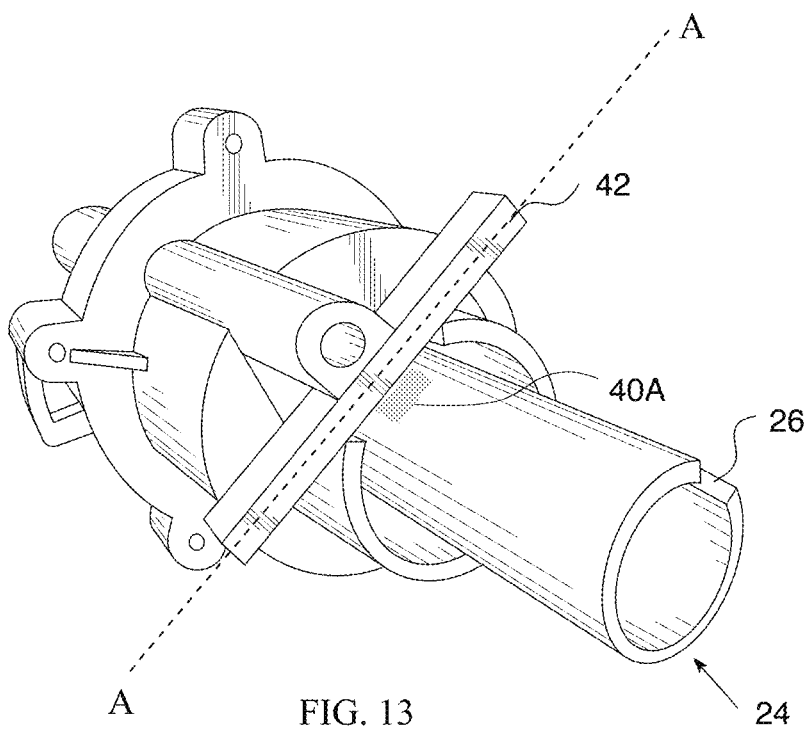
FIG. 13 is an end view of the motor assembly showing a metal insert disposed in the shaft aligned with an embodiment of an orienting magnet.

FIG. 6 is a detailed top view of the dark, feather side 18 of a wing 14. FIG. 7 is a detailed top view of the light, featherless side 20 of the wing 14. The wing 14 panels have a shaft 21 that extends longitudinally away from a proximal end of the panel. The shafts 21 each have a male-type connector 22 which mates with a complementary female-type connector or connection end 24 of a motor shaft. In FIG. 8, the female-type connector 24 has an alignment notch 26, and the male connector 22 has a complementary post or pin that fits in the notch 26. In a preferred embodiment, the alignment notch 26 is aligned upwardly with the dark face 18 of the wings 14 to ensure that the dark sides of the wings 14 are facing upwards when spinning power ceases. The motor module 30, not shown in these Figures, is disposed inside the decoy 10 body 12.

FIGS. 8 to 13 show an embodiment of a motor module 30 for controlling the feather side up stoppage of spinning wings 14, of the decoy 10 of the present invention. The motor module 30 has a housing 32, preferably having two parts, left and right, 32A and 32B, that contain an internal motor 33. The motor 33 is preferably a direct drive DC motor. Mounting flanges 34 A and B connect the motor housing 32 to the interior of the body 12. The connection ends 24 are rotatably driven by the motor 33. The connection ends 24 extend through the flanges 34 and then through lateral apertures 36 in the body 12 to the exterior, whereby they are connectible and dis-connectible to the wings 14 via connectors 22. When the motor 33 is powered ON, the connection ends 24 rotate, which spins the connected wings 14. However, in this configuration, when the motor 33 is powered OFF, the connection ends 24 continue to spin for a certain period of time until friction on wings 14 stops them in a random position, including the undesirable Feather Down position discussed earlier. Significantly, the motor module 30 has at least one magnet 40 disposed in a predetermined position on the connection ends 24 and a complementary ferromagnetic metal bar magnet 42 disposed on the housing 32 such that it is disposed in line with the vertical axis "A" of the motor module 30 and decoy 10 as a whole; the vertical axis "A" can denote the position of decoy 10 in use as illustrated in FIG. 1. In a preferred embodiment, each connection end 24 has two (2) magnets 40 A and B. The magnets 40A/B are disposed on opposite sides of the connection ends 24 and have opposing polarities. One of the magnets 40A is attracted to the bar magnet 42 while the other magnet 40B pushes away from the bar magnet 42. The opposing polarities of the magnets 40A/B can generate magnetic forces to further ensure that the magnets 40A/B are perpendicularly aligned with the alignment notches 26, so that the wings 14 are stopped in the correct, dark side UP, position. As the connection ends 24 spin progressively slower during Power OFF, the magnets 40 A/B begin to exert their opposing forces on the poles of the bar magnet 42 until finally the magnets 40 A/B and bar magnet 42 align with one another in a stable position. This position is aligned with the desirable Feather UP view, the wing panels 14 A and 14B being generally perpendicular to the vertical axis A and generally parallel to the ground or water location of the decoy 10.

The decoy has power and control circuitry including a micro controller and a receiver for communicating with a remote controller and for controlling the motor. In a further preferred embodiment, the micro controller provides a fast, short burst of power to the motor 33 upon deactivation of power to the wings. This burst of power causes a twitch to the wings, which was found to even further improve wing stoppage in the desired position.

Although the apparatus and methods have been described in connection with the field of hunting, it can readily be appreciated that it is not limited solely to such field, and can be used in other fields.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

Although the invention or elements thereof may be described in terms of vertical, horizontal, transverse (lateral), longitudinal, and the like, it should be understood that variations from the absolute vertical, horizontal, transverse, and longitudinal are also deemed to be within the scope of the invention.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A spinning wing bird decoy comprising:
a decoy body being arranged in a predetermined orientation to simulate a bird, the decoy body having a top, a bottom, a first side, and an opposing second side;
a pair of decoy wings, wherein one decoy wing of the pair of decoy wings extends from the first side and an other decoy wing of the pair of decoy wings extends from the second side of the decoy body, and further wherein the pair of decoy wings each have an upward face with a relatively dark, pattern or shade, and a downward face with a relatively light, pattern or shade, the pair of decoy wings being rotatable with respect to the decoy body whereby the rotation of the pair of decoy wings simulates the bird;
a motor assembly disposed inside the decoy body, wherein the motor assembly has a first rotatable drive shaft and a second rotatable drive shaft connected to a motor, the first drive shaft being connectible to a first wing of the pair of wings and the second drive shaft being connectible to a second wing of the pair of wings, whereby powering the motor rotates the pair of decoy wings; and
a wing stopping assembly structured and configured to stop the pair of decoy wings where the upward faces are disposed upwardly with the top of the decoy body, wherein the wing stopping assembly includes at least one drive-shaft magnet coupled to either the first rotatable drive shaft or the second rotatable drive shaft, and at least one bar magnet coupled to the motor assembly and having ends with opposing poles, to which the at least one drive-shaft magnet is attracted to or repelled by one of the poles of the bar magnet.

2. The decoy of claim 1, wherein the decoy body further comprises a structure and graphics simulating a waterfowl or migratory bird,
wherein the upward faces of the pair of decoy wings have graphics simulating an upper surface of a wing of the waterfowl or migratory bird; and
a support that connects the decoy body to a ground or a bottom of a body of water.

3. The decoy of claim 1, wherein the decoy body has a first aperture disposed on the first side of the decoy body, and a second aperture disposed on the second side of the decoy body, wherein the first and second drive shafts extend through the first and second apertures respectively.

4. The decoy of claim 3, wherein the motor assembly includes a pair of mounting flanges structured and configured to couple the motor assembly to the decoy body.

5. The decoy of claim 1, wherein the first decoy wing and the second decoy wing have each a connector coupled to a proximal end thereof for connection with a respective one of the first and second rotatable drive shafts.

6. The decoy of claim 5, wherein the connector has a male-type configuration.

7. The decoy of claim 1, wherein the motor is a direct drive DC motor.

8. The decoy of claim 1, wherein the at least one drive-shaft magnet further comprises two drive-shaft magnets disposed on opposing sides of the first drive shaft, and further wherein a first drive-shaft magnet of the two drive shaft magnets has a first polarity and a second drive-shaft magnet of the two drive shaft magnets has a second, opposing polarity, whereby the first drive-shaft magnet is attracted to a first pole of the poles of the bar magnet and repelled by a second pole of the poles of the bar magnet, and the second drive-shaft magnet is repelled by the first pole of the poles of the bar magnet and attracted to the second pole of the poles of the bar magnet.

9. The decoy of claim 8, wherein the bar magnet is connected to a housing of the motor assembly.

10. The decoy of claim 1 wherein each of the first drive shaft and the second drive shaft have a connection end, wherein each of the connection ends includes an alignment notch being aligned upwardly.

11. A powered, spinning wing, waterfowl or migratory bird decoy, comprising:

a. a decoy body, the decoy body being arranged in a predetermined orientation to simulate a bird, the decoy body having a top, a bottom, a first side, and an opposing second side, and an inner cavity;

b. a pair of decoy wings, wherein one decoy wing of the pair of decoy wings extends from each of the first and second sides of the decoy body respectively, each decoy wing of the pair of decoy wings comprising:

i. a flat panel with a proximal end, ii. a connector coupled to the proximal end, and iii, wherein the flat panel has a first face having a relatively dark first pattern and an opposing second face having a second pattern or shade which is substantially lighter than the first pattern, each decoy wing of the pair of decoy wings being rotatable with respect to the decoy body whereby the rotation of the pair of decoy wings simulates wing movement of a bird;

c. a drive assembly disposed inside the decoy body, the drive assembly having:

i. a housing, ii. a direct drive DC motor disposed in the housing, and iii. first and second rotatable drive shafts driven by the motor, the first drive shaft being connectible to a first wing of the pair of decoy wings and the second drive shaft being connectible to a second wing of the pair of decoy wings, whereby powering the motor rotates the decoy wings; and d. a wing stopping assembly for stopping the decoy wings in a predetermined position wherein the first face is disposed upwardly aligned with the top of the decoy body, the wing stopping assembly including a pair of magnets, of opposing polarity, coupled to the first rotatable drive shaft of the drive assembly, on opposing sides thereof, and at least one bar magnet, coupled to the drive assembly, having opposing poles to which the pair of magnets are attracted to and repulsed by magnetic forces of the opposing poles of the at least one bar magnet.

\* \* \* \* \*